(12) United States Patent
Cheng et al.

(10) Patent No.: US 7,234,079 B2
(45) Date of Patent: Jun. 19, 2007

(54) METHOD AND SYSTEM FOR ENABLING RECOVERY OF DATA STORED IN A COMPUTER NETWORK; A METHOD AND A SYSTEM FOR RECOVERING DATA STORED IN A COMPUTER NETWORK

(75) Inventors: Heng Seng Cheng, Singapore (SG); Lek Heng Ngoh, Singapore (SG); Zheng Yuan, Singapore (SG)

(73) Assignee: Agency for Science, Technology & Research, Singapore (SG)

( * ) Notice: Subject to any disclaimer, the term of this patent is extended or adjusted under 35 U.S.C. 154(b) by 879 days.

(21) Appl. No.: 10/618,170

(22) Filed: Jul. 11, 2003

(65) Prior Publication Data
US 2005/0022046 A1    Jan. 27, 2005

(51) Int. Cl.
*G06F 11/00* (2006.01)
(52) U.S. Cl. ............... 714/20; 714/4; 714/6; 370/223; 370/406
(58) Field of Classification Search ............ 714/20, 714/6
See application file for complete search history.

(56) References Cited

U.S. PATENT DOCUMENTS

| | | | | |
|---|---|---|---|---|
| 5,577,240 A * | 11/1996 | Demers et al. | ......... | 707/8 |
| 5,745,671 A * | 4/1998 | Hodges | ......... | 714/6 |
| 6,112,255 A * | 8/2000 | Dunn et al. | ......... | 710/7 |
| 6,226,111 B1 * | 5/2001 | Chang et al. | ......... | 398/9 |
| 6,434,637 B1 * | 8/2002 | D'Errico | ......... | 710/38 |
| 6,657,952 B1 * | 12/2003 | Shiragaki et al. | ......... | 370/223 |
| 6,751,746 B1 * | 6/2004 | Jain et al. | ......... | 714/4 |
| 6,952,395 B1 * | 10/2005 | Manoharan et al. | ......... | 370/219 |
| 6,990,067 B2 * | 1/2006 | Kaspit et al. | ......... | 370/223 |
| 7,007,189 B2 * | 2/2006 | Lee et al. | ......... | 714/4 |
| 2002/0016933 A1 * | 2/2002 | Smith et al. | ......... | 714/4 |

OTHER PUBLICATIONS

"Wavelength Disk Drive", http://www.cc.on.ca/wdd/ undated.
Nett, et al., A Recovery Model for EXtended Real-Time Transactions, High-Assurance Systems Engineering Workshops, pp. 124-127, Washington D.C., 1997.

(Continued)

*Primary Examiner*—Robert Beausoliel
*Assistant Examiner*—Christopher S. McCarthy
(74) *Attorney, Agent, or Firm*—K. David Crockett, Esq.; Crockett & Crockett

(57) ABSTRACT

A method for enabling recovery of data stored in a computer network, the computer network comprises a plurality of computer nodes, the method comprising the steps of generating a set of redundancy data based on a predetermined relationship between a first set of data and a second set of data, injecting the first set of data, the second set of data and the set of redundancy data into separate looping paths of the computer network, wherein a looping path is a path along a plurality of computer nodes in which data is transported, and the looping paths are defined in separate communication channels between the computer nodes and pass through at least one common node of the computer network, such that the redundancy data and the second set of data can be used to reconstruct the first set of data based on the predetermined relationship between the first and second set of data when the first set of data is lost, thereby enabling the recovery of data stored in the computer network.

21 Claims, 18 Drawing Sheets

OTHER PUBLICATIONS

Li, e tal.,, "Experiments in Fast Restoration using GMPLS in Optical/Electronic Mesh Networks", http://www.mplsrc.com/articles.shtml.

Banerjee, et al. , *"Generalized Multiprotocol Label Switching: An overview of routing and management Enhancement",* IEEE Comms Magazine, pp. 144-151, Jul. 2001.

* cited by examiner

Bit  m  m-1 ............ 3  2  1  0

Bit 0 of Parity Block =   Bit 0 of Data Block 1 XOR
                          Bit 0 of Data Block 2 XOR
                          .
                          .
                          Bit 0 of Data Block N XOR Bit m of Parity Block =   Bit m of Data Block 1 XOR
                          Bit m of Data Block 2 XOR
                          .
                          .
                          Bit m of Data Block N XOR Bit  m  m-1 ............ 3  2  1  0

Bit 0 of Data Block 2 =   Bit 0 of Data Block 1 XOR
                          Bit 0 of Data Block 3 XOR
                          .
                          .
                          Bit 0 of Data Block N XOR Bit m of Data Block 2 =   Bit m of Data Block 1 XOR
                          Bit m of Data Block 3 XOR
                          .
                          .
                          Bit m of Data Block N XOR

METHOD AND SYSTEM FOR ENABLING RECOVERY OF DATA STORED IN A COMPUTER NETWORK; A METHOD AND A SYSTEM FOR RECOVERING DATA STORED IN A COMPUTER NETWORK

Data are normally stored in a computer network comprising computer nodes by storing the data at computer nodes or memory units connected to the computer nodes. In recent years, data is made to store in the computer network by looping the data in the network through a plurality of computer nodes along a defined looping path.

Data stored in the computer network by looping therein is known as persistent data. Using the technique of data persistence in the computer network, wide-area storage devices like giant-sized disks or Inter-Processor Communication systems can be implemented more effectively.

Inter-processor communication in a distributed computer environment using persistent data can be improved as data are now immediately available to any processors that are free to perform computations. Such an implementation can be seen in the Wavelength Disk Drive by CANARIE as disclosed in [1].

One of the main problems of the persistence of data in the computer network is the loss of data due to connection or node failures or corruption of data by bit errors during data transmission. Link or node failures can be caused by an operator pulling out a wrong connection of the computer network [2], failure of an amplifier, a backhoe cutting through a connection between the computer nodes, etc.

The loss or corruption of persistent data affects processes that are running on the distributed processors connected to the computer nodes which make use of the persistent data. This results in roll-back actions to be performed to recover the lost or corrupted data. Roll-back recovery implies that work done is lost and has to be re-done as described in [3].

In an example of a computer network having the computer nodes connected by optical fibers (fiber rings) wherein data is made to persist therein, a cut at any one of the optical fiber will result in loss of data circulating in that optical fiber. In this case, conventional recovery techniques described in [4] and [5] which involves the use of an alternate communication path will not be sufficient as they do not recover data which is already lost.

An alternative solution is to make the distributor processors connected to the computer network mirror a copy of the persistent data in their own storage systems and perform retransmissions when a part of the persistent data is lost. However this alternative solution has the disadvantage of unpredictable delay in recovering the lost data due to the following reasons:
i) the need to determine the locations of the mirrored persistent data,
ii) the need to send a request to the distributed processor that mirrors that lost persistent data,
iii) the need to perform retransmission of persistent data from the individual distributed processor to the computer node,
iv) the low data transfer rate of storage devices used to store the mirrored persistent data, and
v) the potential network congestions between the distributed processors and the computer nodes.

Another disadvantage of recovering lost or corrupted data by retransmission from the distributed processors is the requirement for the distributed processors to stay connected to the computer network before the required computing task is completed in case there is a need to perform retransmission of persistent data from the distributed processors. In other words, after a distributed processor has injected data into the computer network, it must not be shut down or disconnected from the network until the processing of the data is completed. Although this disadvantage can be avoided by mirroring the persistent data in the storage systems of other distributed processors, this will however result in higher processing and storage overheads.

Therefore, it is desirable to have an efficient persistent data recovery method and system which can restore persistent data which is lost or corrupted without involvements from the distributed processors connected to the nodes of the computer network.

SUMMARY OF THE INVENTION

The invention is directed to a method for enabling the recovery of data stored in a computer network, and a method and a system for recovering data stored in the computer network according to the features of the independent claims. Preferred embodiments of the invention are defined in the dependent claims.

The method according to the invention enables data stored in a computer network which comprises a plurality of computer nodes to be recovered when the stored data is lost. The method according to the invention comprises the generation of a set of redundancy data based on a predetermined relationship between at least a first set of data and a second set of data. The first set of data, the second set of data and the generated set of redundancy data are injected into different looping paths of different communication channels between the computer nodes in the computer network. The different looping paths also pass through a common computer node of the computer network.

When the first set of data is lost, the second set of data and the set of redundancy data can be used to reconstruct the first set of data using the predetermined relationship between the first and second set of data when generating the set of redundancy data.

It should be noted that although two sets of data are described to generate the set of redundancy data, the invention shall not be limited to using only two sets of data. In other words, any number of sets of data may be used to generate the redundancy data according to the invention.

Communication channels between the computer nodes allow data to be transported from one computer node to another. Communication channels may be implemented using various connection devices like RJ45 ethernet cables, optical fibers or wireless connection means like radio frequency, infra-red, etc.

Paths are defined in the network along a plurality of nodes where data is transported therein. A looping path refers to a path in the network which starts and ends on the same computer node so that data in the looping path does not have a destination, but is made to circulate in the looping path in the computer network.

In the invention, the first set of data, the second set of data and the set of redundancy data are transported in separate looping paths of the network, wherein the looping paths are defined in separate communication channels. Thus when one communication channel is faulty, the data in other communication channels are not affected.

The method according to the invention allows the computer network to perform fast recovery of data stored in the looping paths of the computer network (persistent data)

when said data is lost or corrupted, without any involvement from any distributed processors connected to the computer nodes.

Since the set of redundancy data was generated based on the predetermined relationship between the first and second set of data, this predetermined relationship can be used by the redundancy data and the second set of data to reconstruct the first set of data, preferably at a predefined node, when the first set of data is lost or corrupted. In this case, the second set of data and the redundancy data must be available in the network to the predefined node in order to reconstruct the first set of data.

Since the generation of the redundancy data and any possible reconstruction of the first set of data does not involve the distributed processors in the data recovery process, the method according to the invention is "transparent" to the distributed processors at the computer nodes. Therefore, the distributed processes need not perform rollbacks for any affected processes. In addition, the distributed processes need not mirror any data that are stored in the computer network for possible retransmission since any lost data can be reconstructed according to the invention.

Another advantage of the invention is that a user can send a task which requires the computational power of any of the distributed process to the computer network from another computer, and disconnects or shuts down his computer. The process is treated as a set of data and stored in the computer network until a distributed processor is available to process the data. When the distributed processor has finished processing the data, the processed data can be injected back into the computer network to be looped therein. The user can then connects his computer to the computer network to retrieve the results of his completed task. Thus, distributed processors that are involved in the computation of a task need not always be made available to the computer network during the processing of the task.

Forward Error Correction (FEC) technique is preferably used to generate the set of redundancy data. There are different types of FEC techniques including Reed-Solomon Coding and Exclusive-OR (XOR) coding. In FEC coding, in particular XOR coding, the set of redundancy data is also known as the set of parity data. According to a preferred embodiment of the invention, XOR coding is used as the FEC technique for generating the set of redundancy data.

Specifically, the set of parity data is generated based on a XOR relationship between the first and second set of data. When the first set of data stored in the network is lost, the first set of data can be reconstructed using the XOR relationship between the second set of data and the set of parity data.

The advantage of using the XOR coding as the FEC technique is that XOR coding is simple to implement, but yet is able to produce parity data which is equally accurate when compared to other more complex FEC techniques.

In a preferred embodiment of the invention, the method further comprises adding an identity field to each of the first set of data, the second set of data and the set of redundancy data. Each identity field has a predefined value which corresponds to the predefined values of the identity field of the other two sets of data. The identity fields are also injected together with the respective data sets into the respective looping paths of the computer network.

The purpose of the identity field is to allow synchronization of the first set of data, the second set of data and the set of redundancy data in the looping paths, so that the correct second set of data and the set of redundancy data can be retrieved to reconstruct the first set of data when said set of data is lost.

Therefore, when reconstruction of the first set of data is needed, each of the second set of data and the set of redundancy data having identity field with the predefined value that corresponds to the predefined value of the identity field of the lost first set of data are retrieved for reconstruction of the first set of data.

When a new first set of data is to be stored in the looping path of the network, according to the method of the invention the new first set of data is received and an identity field is added to the new first set of data, wherein the identity field has the same predefined value as the identity field of the first set of data. The second set of data from the respective looping path which has the identity field with the predefined value corresponding to the first set of data is read. A new set of redundancy data is generated based on a predetermined relationship between the new first set of data and the second set of data.

The new first set of data, together with the identity field, is injected into the looping path of the first set of data and replaces the first set of data. Similarly, the new set of redundancy data is also injected into the looping path of the set of redundancy data, and replaces the set of parity data. The new set of parity data also comprises an identity field having the predefined value which corresponds to the predefined value of the first set of data.

According to a further preferred embodiment of the invention, the predefined values of the identity fields of the first set of data, the second set of data and the set of redundancy data are set to the same value. The advantage of setting the predefined values to the same value is that only one predefined value of the identity field is needed to identify, and hence, synchronize the respective sets of data from the other looping paths for reconstruction purpose. Therefore, a relationship which correlates the predefined values of the identity field of the first set of data, the second set of data and the set of parity data need not be defined.

In an alternative preferred embodiment of the invention, the first and second set of data to be stored in the computer network is formed from a data packet. A payload of the data packet is first fragmented into at least a first sub-packet and a second sub-packet. A header of the data packet is appended to both the first and second sub-packet, such that the first sub-packet and the data packet header forms the first set of data, and the second sub-packet and the data packet header forms the second set of data.

In another further preferred embodiment of the invention, an identity field having a predefined value is added to each of the first set of data, the second set of data and the set of redundancy data before they are injected into the separate looping paths of the computer network. The predefined values of the identity fields correspond to one another and function in the same manner as the identity fields described in the earlier embodiments.

The advantage of this alternative preferred embodiment is that a single data packet is used to form the first and second set of data and the set of redundancy data to be stored in the network. Therefore, it is not dependent on the availability of other data in the network to enable the recovery of data stored in the network.

In another aspect of the invention, a method for recovering data stored in a computer network is provided, the computer network comprises a plurality of computer nodes. The method comprises reconstructing a first set of data from a second set of data and a set of redundancy data stored in separate looping paths of the computer network at a predefined node when the first set of data is lost, wherein the set of redundancy data is generated based on a predetermined relationship between the first set of data and the second set of data. The reconstructed first set of data is injected into the looping path of the first set of data to be stored therein, thereby recovering the first set of data stored in the computer network.

According to the method according to this aspect of the invention, the data in the network is reconstructed when it is lost or corrupted. After the lost data has been reconstructed, it is then injected back into the respective looping path of the network to be circulated therein, thereby recovering the set of data to the looping path of the network.

The recovering of the lost data according to the invention is performed efficiently and hence transparent to the distributed processors connected to the nodes of the computer network, eliminating the need for the distributed processors to time-out and perform any roll-back recovery processes.

The set of redundancy data is preferably generated based on an Exclusive-OR relationship between the first and second set of data. And when the first set of data is lost, the first set of data is preferably reconstructed based on the Exclusive-OR relationship between the second set of data and the set of redundancy data. The redundancy data in this case is also known as the parity data.

The advantage of using the Exclusive-OR relationship as the predetermined relationship between the first and second set of data for generating the set of redundancy data is its simplicity in implementation, and hence, no complex computation is needed, as already described earlier.

In a preferred embodiment of the invention, the second set of data and the set of redundancy data are first read from the respective looping paths of the network. The respective second set of data and the set of redundancy data are identified with the first set of data by an identity field having a predefined value, wherein the predefined value corresponds to a predefined value of an identity field of the first set of data.

The identity field are used to synchronize the first set of data, the second set of data and the set of redundancy data, so that the correct second set of data and the set of redundancy data are used for reconstructing the first set of data. To synchronize the sets of data, the identity fields are set to a predefined value such that the predefined values of the sets of data correspond with one another.

In another preferred embodiment of the invention, the second set of data and the set of redundancy data are first read from the respective looping paths of the network, wherein the second set of data and the set of redundancy data are each identified with the first set of data by having the same data packet header and an identity field including a predefined value which corresponds to a predefined value of an identity field of the first set of data.

In this preferred embodiment, the data packet header and the identity field are used to synchronize the sets of data, so that the correct second set of data and the set of redundancy data are used to reconstruct the first set of data. In other words, when the first set of data is lost, the predefined node reads the second set of data and the set of redundancy data which have the same data packet header and the identity field with the predefined value corresponding to the first set of data for reconstructing the first set of data.

The invention also provides for a data recovery system for data stored in a computer network, the system comprising a processing unit at at least one predefined node for generating a set of redundancy data based on a predetermined relationship between a first set of data and a second set of data, and a read and write unit for injecting the first set of data, the second set of data and the set of redundancy data into separate looping paths of the computer network, wherein the looping path is a path along a plurality of computer nodes in which data is transported, and the separate looping paths are defined in separate communication channels between the computer nodes and pass through at least one common node of the computer network.

The processing unit can be implemented using a specialized computer (e.g. a network processor) or a general purpose computing machine (e.g. a low-cost workstation or server) for performing computations to generate the set of redundancy data. Specialized computers such as network processors are necessary for higher capacity of persistent data whereas general purpose computing machines such as workstations or servers are suitable if the DIN network is handling a smaller capacity of persistent data. The read and write unit may comprise of an optical add drop multiplexer (OADM), an optical power monitoring system and other optical components. An advantage of this system is that a failure in any of one of the optical components at each node will not lead to the malfunctioning of the entire node.

According to a preferred embodiment of the invention, the communication channels between the computer nodes are optical fiber cables. The advantage of optical fiber cables is that it has a very high bandwidth, with a current capacity of up to 1.6 Terabits per second. This is because the advent of Dense Wavelength Division Multiplexing (DWDM) allows each optical fiber to be able to carry multiple wavelengths which can be processed individually by computer nodes. Therefore, optical fiber cables can allow part of its bandwidth to be used for storing data, but yet do not significantly affect the bandwidth used for normal transportation of data.

Furthermore, data in optical fiber cables travels at about 0.66 times the speed of light. Therefore, data which is stored in the looping paths in the optical fiber cables can be delivered to nodes requesting them almost instantaneously even when the nodes are thousands of kilometers away.

As mentioned earlier, the communication channels need not be restricted to using optical fibers, but may also be implemented using RJ45 ethernet cables or wireless connection means like radio frequency, infra-red, etc.

According to the preferred embodiment of the invention, the data recovery system further comprises at least an optical switch for switching a pair of optical fiber cables. The optical switch is used to provide an alternate path in the computer network in the event of a communication channel failure. For example, when one of the optical fiber is broken, the optical switch at a computer node before the broken portion can switch the flow of data to another fiber, thus avoiding the broken optical fiber.

The data recovery system comprises preferably at least three pairs of optical fibers connecting the computer nodes. The use of three pairs of optical fibers, and corresponding three optical switches, to connect to each computer node allows partial restoration of looping path, and hence, storage capacity of the computer network by forming a new looping path in the event of an optical fiber failure without affecting the other existing looping paths.

The invention further provides for a data recovery system for data stored in a computer network, comprising a processing unit at at least one node and a read and write unit. The processing unit is used for reconstructing a first set of data from a second set of data and a set of redundancy data stored in separate looping paths of the computer path when the first set of data is lost, wherein the set of parity data is generated based on a predetermined relationship between the first set of data at the second set of data. The read and write unit is used for injecting the reconstructed first set of data into the looping path of the first set of data to be stored therein to recover the first set of data stored in the computer network, wherein the looping path is a path along a plurality of computer nodes in which data is transported, and the separate looping paths are defined in separate communication channels between the computer nodes and pass through at least one common node of the computer network.

According to a preferred embodiment of the invention, the communication channels between the computer nodes are preferably optical fiber cables. The system according to the preferred embodiment also further comprises at least an optical switch for switching a pair of optical fiber cables. The data recovery system preferably comprises at least three pairs of optical fibers connecting the computer nodes. The advantages of the features of this preferred embodiment are already described above.

In this context it should be mentioned that any kind of algorithm for generating the redundancy data may be used, e.g. any algorithm for generating a cyclic redundancy code, in particular any algorithm for generating a cyclic binary code (for example the Cyclic Hamming Code, the Cyclic Abramson Code, the so called Fire Code, the Bose-Chaudhuri-Code (BCH-Code), the Reed-Muller Code, the Reed-Solomon Code).

DETAILED DESCRIPTION OF THE PREFERRED EMBODIMENTS OF THE INVENTION

Figure 1:
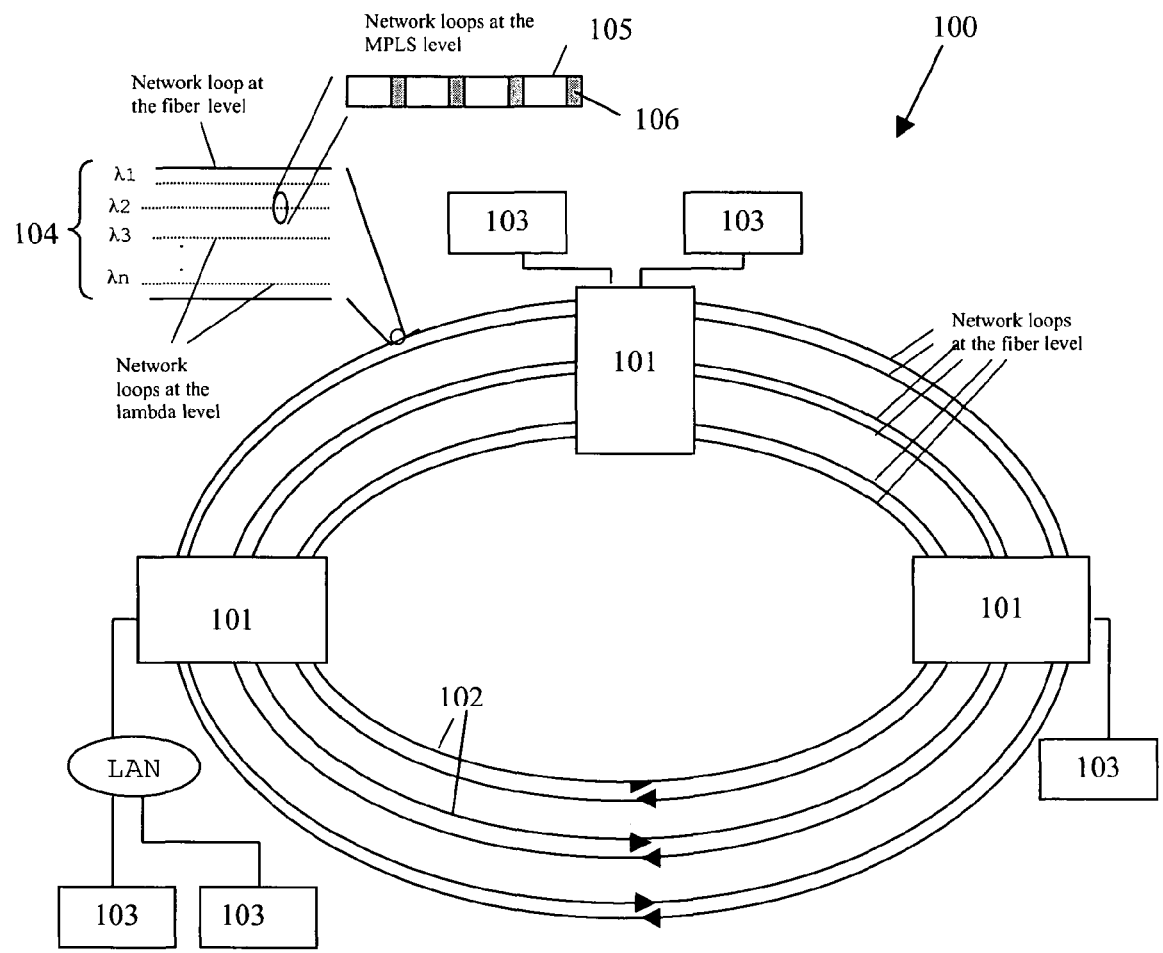
FIG. 1 shows a computer network comprising a plurality of nodes being connected using optical fibers in a ring typology.

FIG. 1 shows a computer network 100 comprising a plurality of computer nodes 101 connected in a ring topology. The computer nodes 101 are connected to one another using optical fibers 102 in a form of a ring, and distributed processors 103 are connected to the computer nodes 101.

The Multiprotocol Label Switching (MPLS) is preferably used for controlling the forwarding of data packets in the computer network 100. This is because MPLS not only supports data packet switching at the computer nodes 101, but also supports lambda switching and fiber switching at the computer nodes 101, in the optical fiber network 100.

There are three levels of network loops in the optical fiber network 100: fiber level, lambda level and packet level. Network loop at fiber level refers to the optical fibers 102 which are used to connect each computer nodes 101. Network loop at lambda level refers to separate wavelengths, called lambdas 104, which are used as tracks in each optical fiber 102 to transport separate data streams 105. Network loop at packet level refers to the individual data packets 105 which made up the data stream. Each MPLS data packet 105 comprises a MPLS packet header 106 having a label. Data packets 105 with the MPLS packet header 106 carrying the same label will travel in the same network loop.

Figure 2:
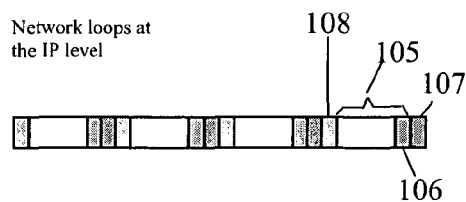
FIG. 2 shows a network loop of the computer network of FIG. 1 at IP packet level.

It should be noted that other network protocols may be used for controlling the forwarding of data packets in the computer network 100. For example, Internet Protocols (IP) may be used for forwarding of data packets in a network with Ethernet or SONET as the WAN (Wide Area Network) transport technology in another embodiment. In this case, the packet level refers to each IP data packet 105 comprising an IP packet header 106, an Ethernet header 107 and an Ethernet trailer 108 as shown in FIG. 2.

Figure 3:
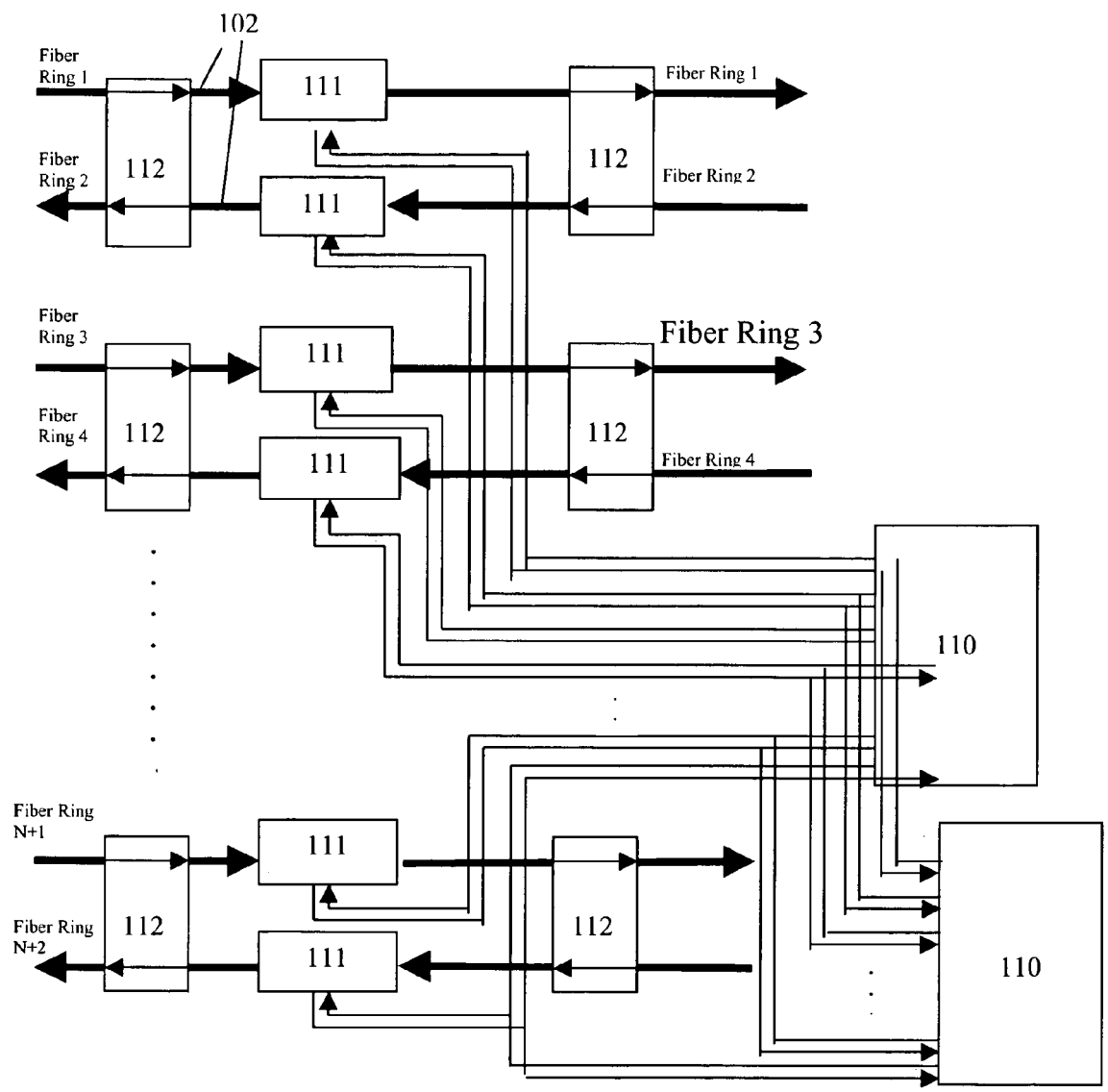
FIG. 3 shows a data recovery enabled node in the computer network according to the invention.

At least one of the computer node 101 is enabled to implement the method for data recovery according to the invention. Each data recovery enabled node (referred to as DR-enabled node) preferably comprises two processors 110, a read/write module 111 for each optical fiber 101 and two 2-by-2 optical switches 112 for each pair of optical fiber 101 as shown in FIG. 3.

The processors 110 are used to perform Forward Error Correction (FEC) computations for generating parity data, and also to reconstruct lost or corrupted data in any of the optical fibers 101. The processors 110 may be implemented simply by a low-cost general purpose computer (e.g. workstation or server). The read/write module 111 is used for reading and writing data from and into the computer network 100 to be stored (known as persistent data). The read/write module 111 may comprise an optical add drop multiplexer (OADM), an optical power monitoring system and other optical components (all not shown).

Such an implementation of the DR-enabled node ensures that a failure in any one of the components in the DR-enabled node does not result in the failure of the entire node (or even the entire network).

The optical switches 112 allow alternate communication paths to be set up in the event of link failures, for example, when one of the optical fiber 101 is cut. In this case, the data in that optical fiber 101 will be lost. The respective optical switch 112 can then switch the connection of the optical fibers 101 so that data in the optical fiber 101 can be re-routed to another optical fiber 101, and hence, partially restoring the storage capacity of the optical fibers 101 of the computer network 100.

Figure 4:
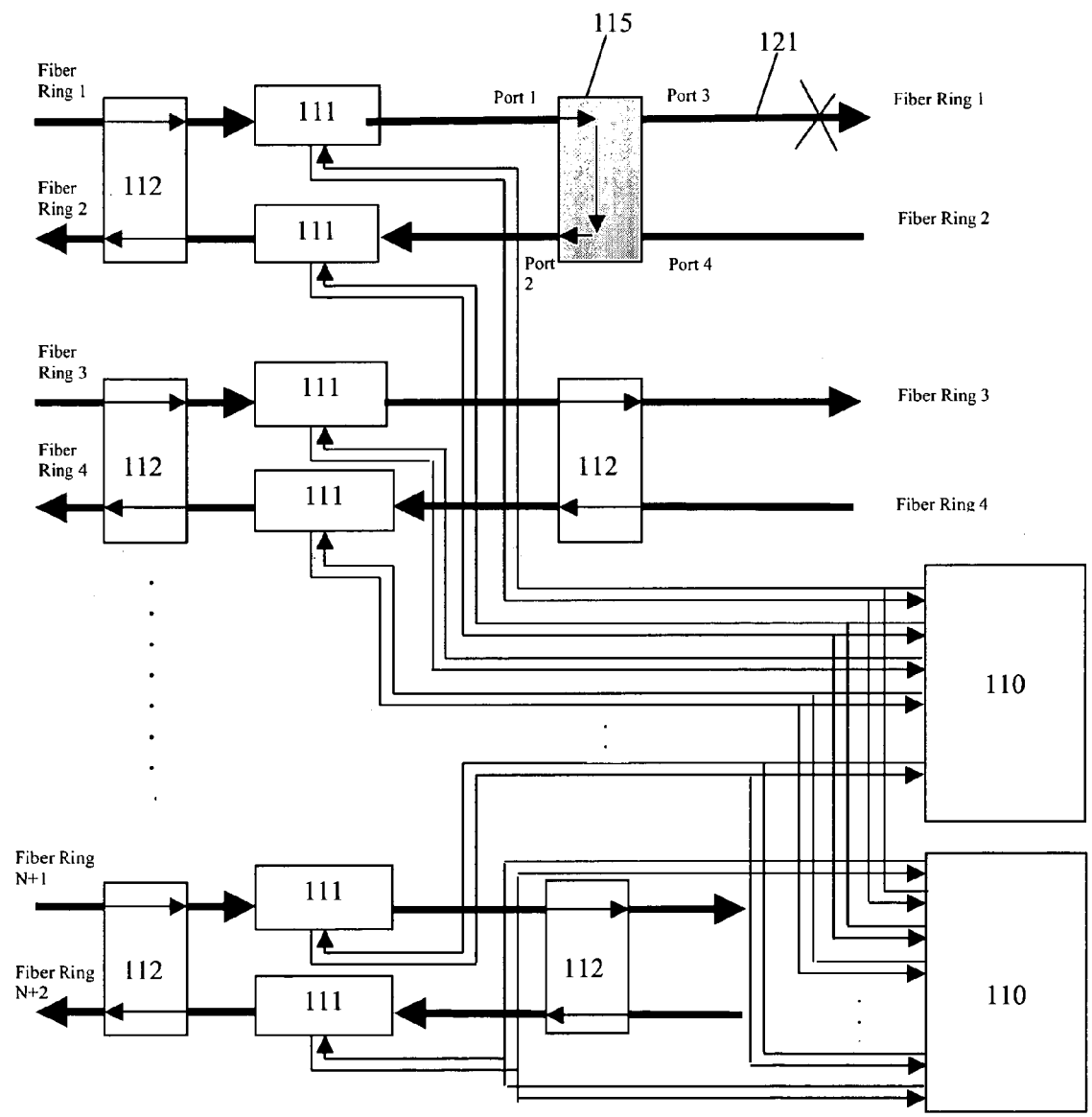
FIG. 4 shows the data recover enabled node setting up an alternate communication path in the event of an optical fiber link fault according to the invention.
Figure 5:
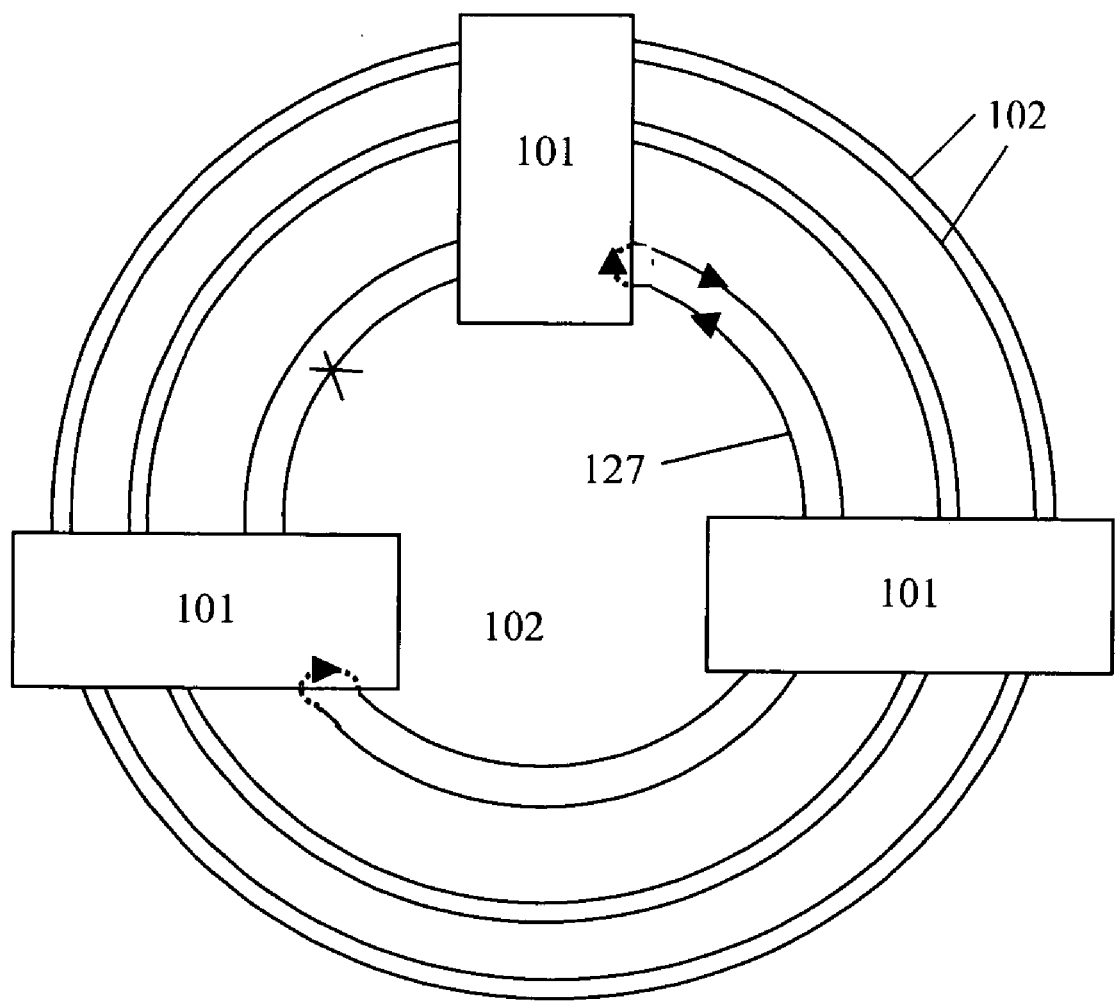
FIG. 5 shows the alternate communication path in the computer network according to the invention.

FIG. 4 shows an example when there is a cut in the optical fiber 121. The respective optical switch 115 disconnects port 1 from port 3 and port 2 from port 4, and connects port 1 to port 2. Thus a new single optical fiber ring is formed, resulting in a new network loop 127 at fiber level in the computer network 100 as shown in FIG. 5.

It should be pointed out that the computer network 100 preferably comprises 3 pairs of optical fibers 102 connecting each node 101, which is the minimum number of optical fibers 102 for the DR-enabled computer nodes 101 to perform partial restoration of storage capacity of the computer network 100.

Even though the optical switches 112 allow partial restoration of storage capacity of the network 100, they do not recover data which is already lost. The lost data can however be recovered according to the method as described below.

The DR-enabled node 101 of the computer network 100 uses a Forward Error Correction (FEC) technique, in particular Exclusive-OR (XOR) coding, to generate a set of parity data based on at least two other set of persistent data in other optical fibers 102. In the event that any one set of the persistent data is lost, this set of parity data, together with the other set of persistent data, is used to reconstruct the lost persistent data. It should be noted that the set of parity data and the other persistent data must not be lost or corrupted in order for the lost persistent data to be reconstructed.

Figure 6:
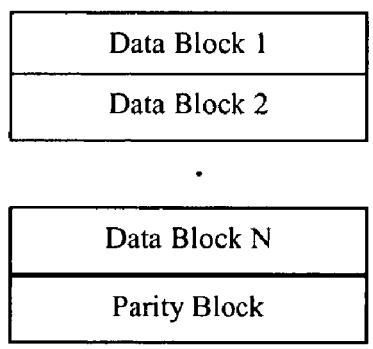
FIG. 6 shows how a set of parity data is generated from a plurality of data blocks using FEC coding.
Figure 7:
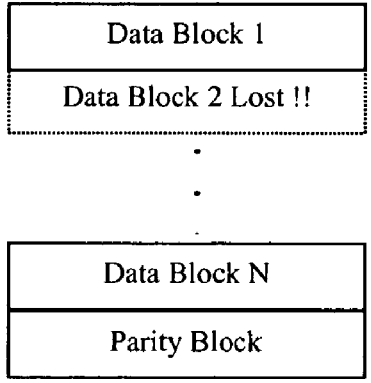
FIG. 7 shows how a data block can be reconstructed from other data blocks and the set of parity data using FEC coding.

FIG. 6 shows an example on how the set of parity data is generated, and FIG. 7 shows how persistent data can be reconstructed when the said persistent data is lost.

N Data blocks are stored as persistent data in the computer network and each data block comprises m bits, wherein N and m are positive integers. The set of parity data for the N data blocks is generated by performing an XOR coding on each respective bits of the data blocks, resulting in a m-bit set of parity data. The N data blocks together with the set of parity data forms a FEC codeword. The set of parity data is injected into an optical fiber which is separate from the optical fibers of the data blocks.

In the event when the data block 2 is lost, the data block 2 can be reconstructed by performing the XOR coding on each respective bits of the other data blocks and the set of parity data as illustrated in FIG. 7.

According to the invention, when a set of data is to be stored in the computer network, it is first stored in a buffer of a DR-enabled node for generating the set of parity data by the processor of the node. The process of generating the set of parity data is called FEC encoding.

Two preferred embodiments of the FEC encoding processed are described hereafter.

FEC Encoding Using the Fragmentation Method

Figure 8:
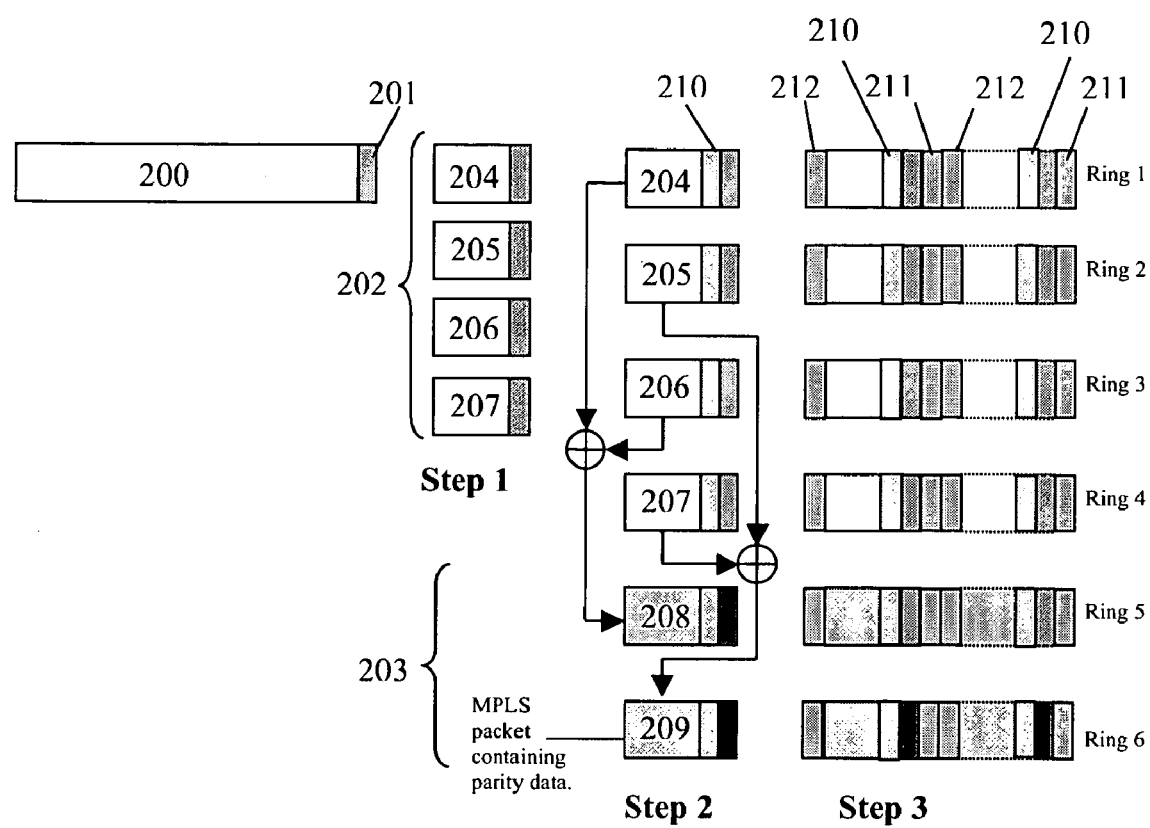
FIG. 8 shows the FEC encoding process using a fragmentation method according to a preferred embodiment of the invention using MPLS packets.

The FEC encoding method using the fragmentation method for MPLS data packets is shown in FIG. 8. In this method, each data packet which is to be stored in the network is received by the processor at the DR-enabled node. Since MPLS is used as the controlling plane at the computer nodes of the network according to the preferred embodiment of the invention, the data packets to be stored in the network are MPLS data packets. Each MPLS data packet comprises a packet payload 200 and a packet header 201.

In a first step, the processor fragments the packet payload 200 into N parts of sub-packets 202 of equal size (N is 4 in this example). Each sub-packet 202 is encapsulated with the original MPLS packet header 201.

In a second step, the processor performs FEC computation on the sub-packets 202 to generate the set of parity data 203. It should be noted that FEC computation is only generated on the fragmented payload 202 and not on the MPLS packet header 201. The set of parity data 203 is also encapsulated with the MPLS packet header 201.

In the example of FIG. 8, a first and third sub-packets 204,206 are used to form a first set of parity data 208, and a second and fourth sub-packets 205,207 are used to form a second set of parity data 209. Thus the first and third sub-packets 204,206 and the first set of parity data 208 forms a FEC codeword, and similarly, the second and fourth sub-packets 205,207 and the second set of parity data 209 forms another FEC codeword.

A 64-bit identity (ID) field 210 containing an ID value is further appended to each of the sub-packets 202 and the sets of parity data 203. The function of the ID field 210 is to synchronize the sub-packets 202 and the sets of parity data 203 looping in different optical fiber rings that belong to the same FEC codeword.

The third step is to inject the sub-packets 202 and the sets of parity data 203, together with the encapsulated packet headers 201 and the appended ID fields 210, into the lambdas of separate optical fiber rings.

In the decoding process, the processor of the DR-enabled node or other DR-enabled nodes reads the fragmented MPLS data packet or sub-packets circulating in the lambdas of the different optical fiber rings and determines if any of the fragmented MPLS data packet 202 is lost. If a fragmented MPLS data packet 202 is lost, the processor will perform FEC computations to reconstruct the lost fragmented MPLS data packet 202 and injects the reconstructed fragmented MPLS data packet 202 into the respective lambda of the corresponding fiber ring.

Figure 9:
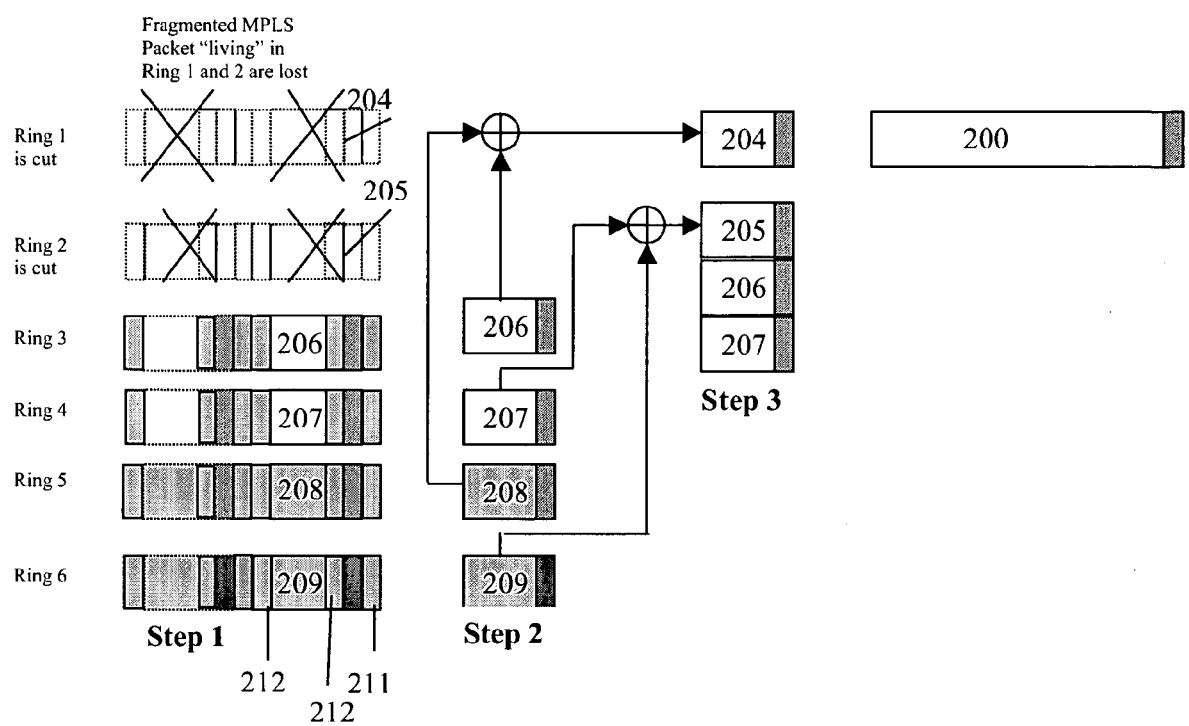
FIG. 9 shows the FEC decoding process using the fragmentation method according to the preferred embodiment of the invention using MPLS packets.

The decoding process of the fragmentation method for MPLS data packets is summarized in FIG. 9. In this case, the first and second fragmented data packets 204,205 are lost. The processor reconstructs the first fragmented data packet 204 by performing FEC computation using the third fragmented data packet 206 and the first set of parity data 208. Similarly, the processor performs FEC computation using the fourth fragmented data packet 207 and the second set-of parity data 209 to reconstruct the second fragmented data packet 205.

The correct fragmented MPLS data packets 202 and the set of parity data 203 for reconstructing the lost fragmented MPLS data packets are identified based on the fact that they all carry the same MPLS packet header 201 as well as the same ID value of the ID field 210.

When the original MPLS data packet stored in the network is to be read, the respective fragmented MPLS packets 204,205,206,207 are synchronized at the DR-enabled node based on their packet headers 201 and the ID fields 210, and reassembled to form the original MPLS data packet 200 with only one MPLS packet header 201. The other MPLS packet headers 201 from the fragmented packets 202 and all the identity fields 210 are discarded once the original MPLS packet 200 is assembled.

It should be noted that the ID fields 210 need not be appended to each of the sub-packets 202 and the sets of parity data 203 in order for the invention to work. In this case, the fragmented MPLS packets 202 and the sets of parity data 203 can be synchronized purely based on the MPLS packet headers 201 alone.

It should also be noted that Ethernet may be used as the WAN transport technology instead of optical fibers. When Ethernet is used, each MPLS sub-packet 202 and set of parity data 203 will be further encapsulated by an Ethernet header 211 and an Ethernet trailer 212. Alternatively, SONET or other WAN transport technology may be used instead of Ethernet WAN transport technology.

The fragmentation method may also be implemented using the IP protocols at the computer nodes of the network, preferably using Ethernet as the WAN transport technology. In this case, the data packets to be stored in the network are IP packets. Each IP data packet also comprises an IP packet payload 220 and an IP packet header 221.

Figure 10:
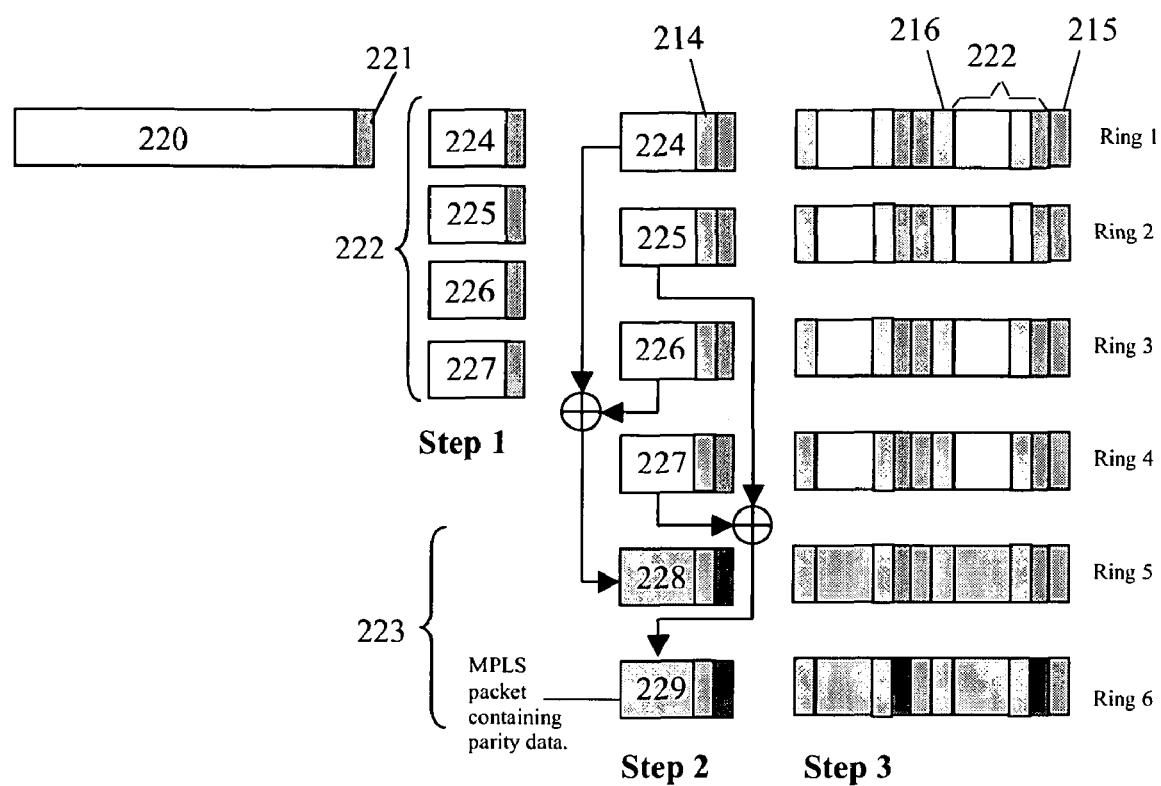
FIG. 10 shows the FEC encoding process using a fragmentation method according to the preferred embodiment of the invention using IP packets.

The FEC encoding process using the fragmentation process for IP data packets is the same for MPLS data packets as already described above. Specifically, the IP data packets are processed in the same manner as the MPLS data packets. However, in the third step when the sub-packets 222 and the set of parity data 223 are to be injected into separate network rings at the computer nodes, hardware interfaces at the computer nodes will automatically encapsulate all the IP sub-packets 222, 223 with a frame header 215 and a frame trailer 216 as illustrated in FIG. 10.

When Ethernet framing is used for encapsulating the IP sub-packets 222 and sets of parity data 223, the frame header 215 and frame trailer 216 are known as Ethernet header and Ethernet trailer, respectively. It should be noted that other types of framing-such as SONET framing can also be used.

Figure 11:
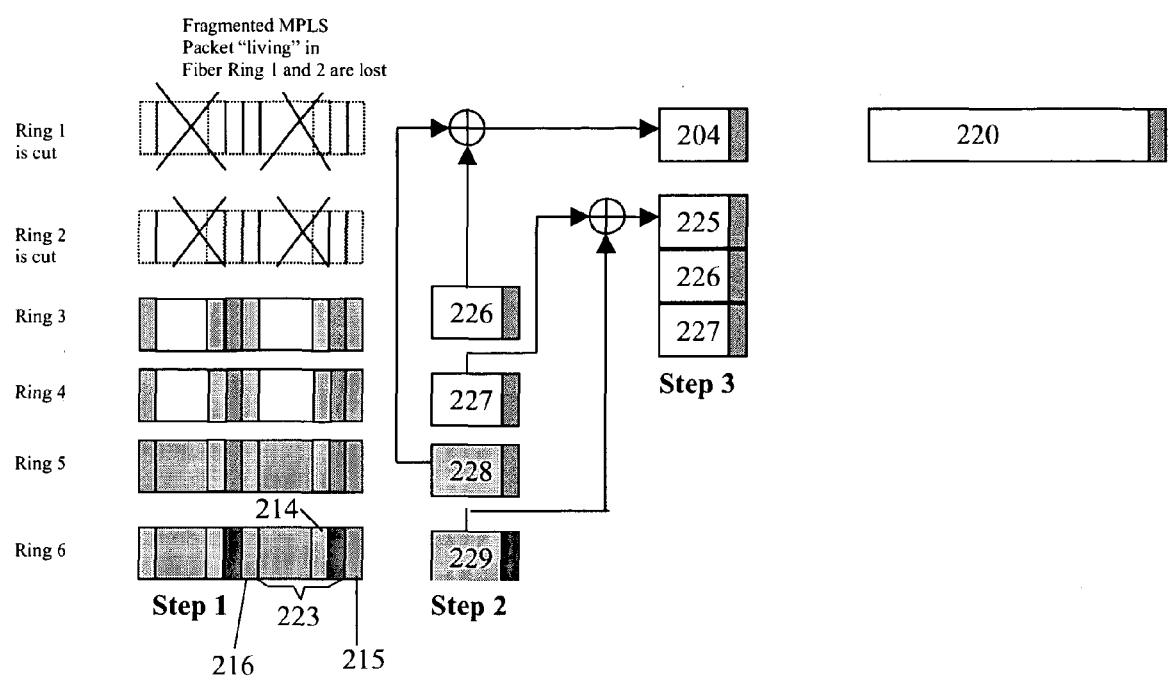
FIG. 11 shows the FEC decoding process using the fragmentation method according to the preferred embodiment of the invention using IP packets.

The FEC decoding process using the fragmentation process for IP data packets is the same for MPLS data packets as already described above, and is also illustrated in FIG. 11. The frame headers 215 and frame trailers 216 of the third and fourth fragmented data packet 226,227 and the first and second sets of parity data 228,229 are first removed by the respective computer nodes before they are used for reconstructing the first and second fragmented data packets 224, 225.

FEC Encoding Using Non-fragmentation Method

In this non-fragmentation method, the set of parity data is computed over different MPLS data packets from different optical fibers. During the encoding process, the processor of the DR-enabled node reads the MPLS packets circulating in other optical fiber rings and perform FEC computations to generate the parity data based on the MPLS data packet to be stored and the other MPLS packets from other fiber rings.

Figure 12:
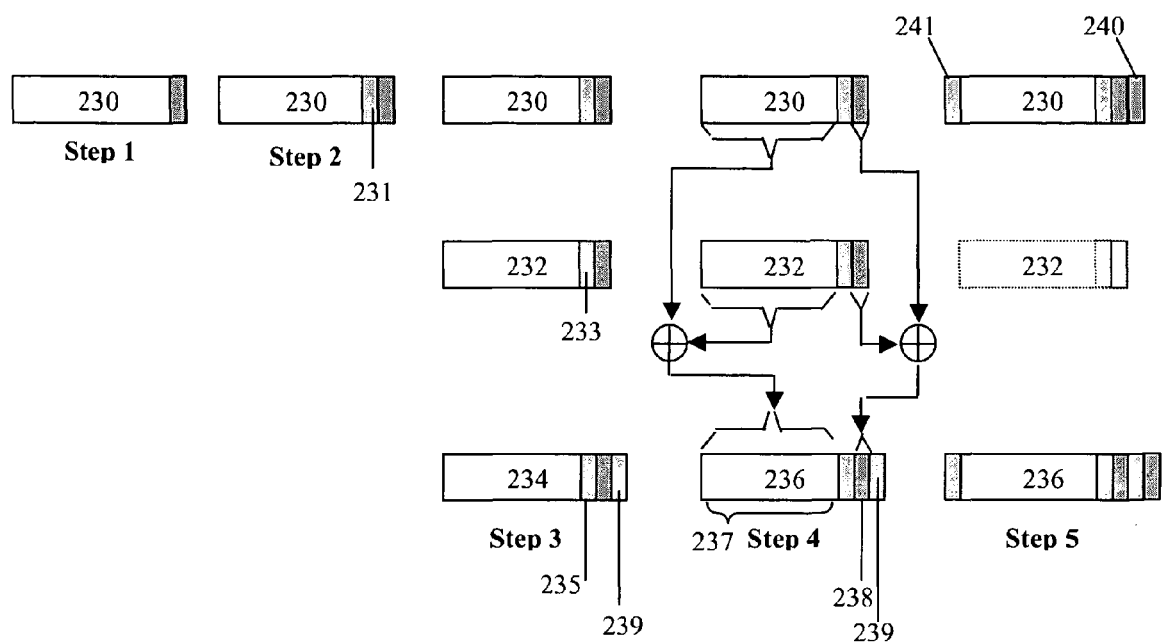
FIG. 12 shows the FEC encoding process using a non-fragmentation method according to an alternative preferred embodiment of the invention using MPLS packets.

FIG. 12 illustrates the non-fragmentation method for MPLS data packets according to a preferred embodiment of the invention.

In the non-fragmentation method, the processor of the DR-enabled node receives the MPLS data packet 230 to be stored in the network. The processor then determines if this MPLS data packet 230 will be used to form a new FEC codeword or becomes part of an existing FEC codeword, and inserts a 64-bit identity (ID) field 231. If the MPLS data packet 230 is to form a new FEC codeword, the ID field 231 will contain a new ID value.

If the MPLS data packet 231 is to become part of an existing FEC codeword, then the ID field 231 will have an ID value which is the same as the other MPLS data packets belonging to the same FEC codeword. In the example illustrated in FIG. 12, the processor reads another MPLS packet 232 from Fiber Ring 2 with the ID field 233 whose ID value will be assigned to the ID field 231 of the MPLS packet 230 to be stored. The MPLS packet 232 of Fiber Ring 2 may be carrying data from other applications. Similarly, the processor also reads from Fiber Ring 3 an MPLS packet 234 which carries parity data and has an ID field 235 with the same ID value. The MPLS parity packet 234 comprises an additional MPLS header 239.

The processor performs FEC encoding on the MPLS packets 230,232 to generate a new parity data 236. The payload of the new parity data packet 237 should preferably be generated from the payload of the MPLS data packet 230,232 and the header of the new parity packet 238 should also preferably be generated based on the header of the data packet 230,232. It should be noted that the ID fields 231, 233,235 are not protected using FEC encoding, as all MPLS packets belonging to the same FEC codeword have the same ID value.

The processor then injects the MPLS data packet 230 together with the corresponding ID field 231 into Fiber Ring 1 to be stored therein. If Fiber Ring 1 contains an older MPLS data packet with the same ID value, the processor will remove the older MPLS data packet before injecting the MPLS data packet 230 into the Fiber Ring 1. Similarly, the older parity data in Fiber Ring 3 having the same ID value is removed, and the new parity data 236 (together with the ID field 235) is injected into Fiber Ring 3.

Figure 13:
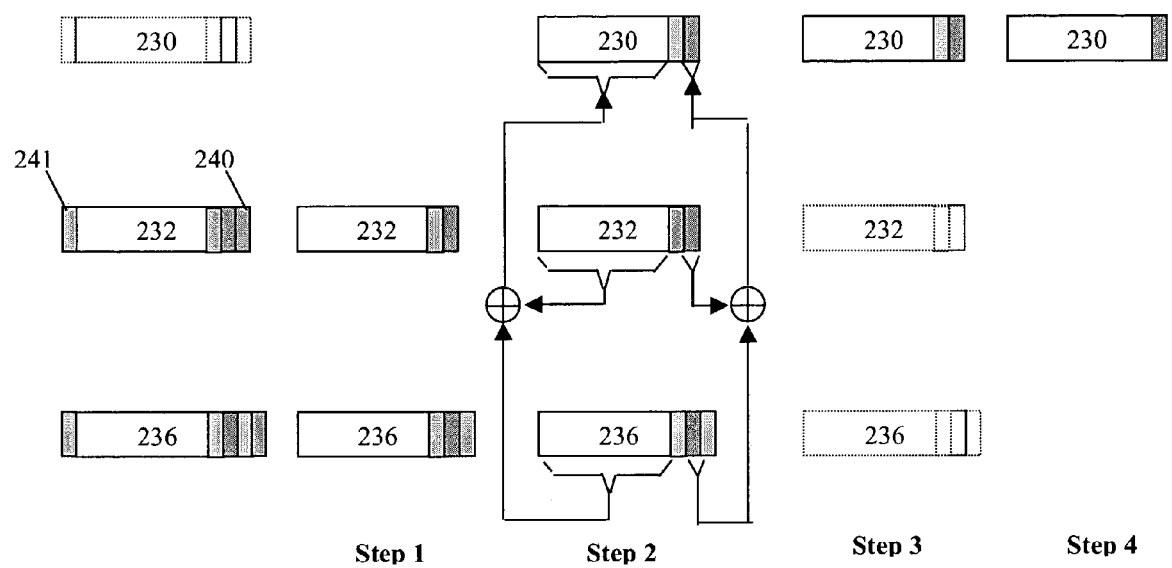
FIG. 13 shows the FEC decoding process using the non-fragmentation method according to the alternative preferred embodiment of the invention using MPLS packets.

FIG. 13 shows an illustration of the FEC decoding process using the non-fragmentation method for MPLS data packets.

When the fiber ring where the MPLS packet 230 is circulated therein is broken, the MPLS packet 230 will be lost. However, the lost MPLS packet 230 can be reconstructed by reading the respective MPLS data packets 232, 236 from the other corresponding fiber rings, wherein the MPLS data packet 236 contains the parity data. The ID values of the ID fields belonging to the data packets 230, 232,236 are used to synchronize the MPLS packets 230, 232,236 in order to reconstruct any lost MPLS packets correctly.

The processor performs FEC computation using the MPLS data packets 232,236 to reconstruct the lost MPLS packet 230. The ID field 231 of the reconstructed MPLS packet 230 can simply be copied from the ID field 233,235 of either one of the respective data packets 232,236. The reconstructed MPLS packet 230 and the ID field 231 are injected back into the fiber ring to be circulated therein. When any of the MPLS packets 230,232 is to be sent to a distributed processor, the respective ID fields 231,233 are first removed by the DR-enabled node.

It should also be noted that Ethernet may be used as the WAN transport technology instead of the optical fiber. When Ethernet is used, each MPLS packet 230 will be further encapsulated by an Ethernet header 240 and an Ethernet trailer 241. Alternatively, SONET or other WAN transport technology may be used instead of Ethernet WAN transport technology.

Similarly, the non-fragmentation method may also be implemented using IP protocols at the computer nodes of the network, preferably using Ethernet as the WAN transport technology.

Figure 14:
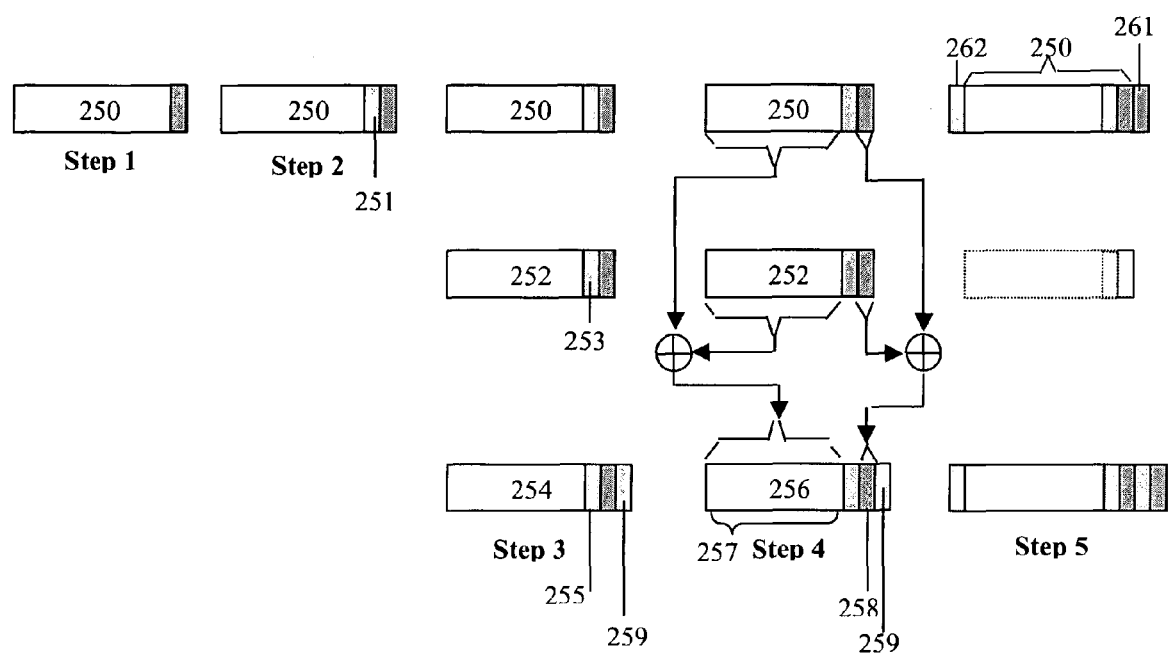
FIG. 14 shows the FEC encoding process using a non-fragmentation method according to the alternative preferred embodiment of the invention using IP packets.

The FEC encoding process using the non-fragmentation process for IP data packets is the same for MPLS data packets as already described above. However, before the IP data packets 250 are injected at the computer nodes into the respective network Rings to be stored therein, hardware interfaces at the computer nodes will automatically encapsulate all the IP packets 250,252,256 with a frame header 261 and a frame trailer 262 as illustrated in FIG. 14.

Also, when Ethernet framing is used for encapsulating the IP packets 250,252,256, the frame header 261 and frame trailer 262 are known as Ethernet header and Ethernet trailer, respectively. It should be noted that other types of framing such as SONET framing can also be used.

Figure 15:
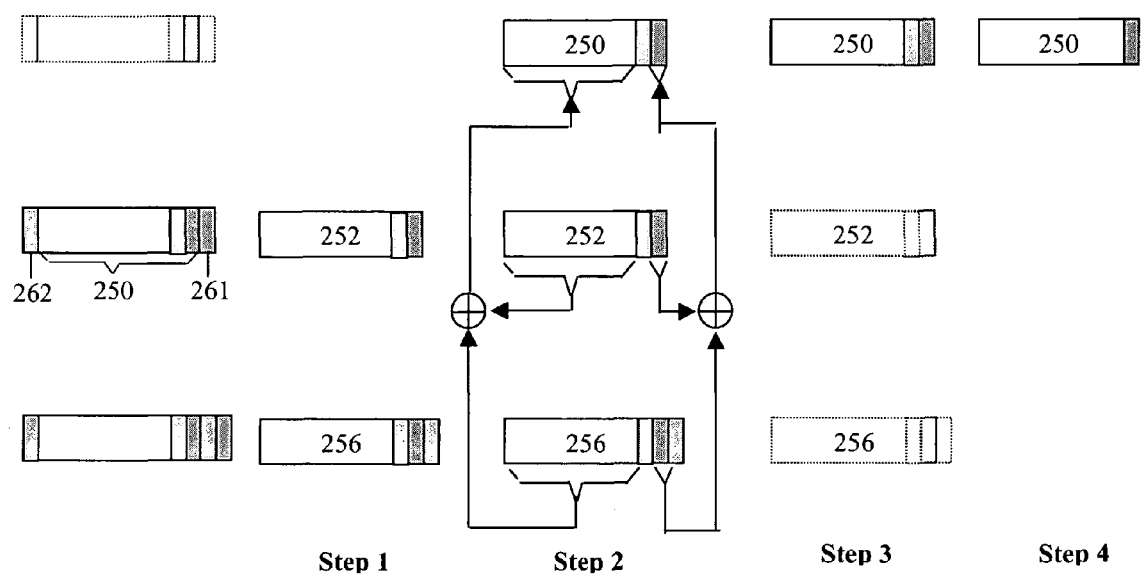
FIG. 15 shows the FEC decoding process using the non-fragmentation method according to the alternative preferred embodiment of the invention using IP packets.

The FEC decoding process using the non-fragmentation process for IP data packets is the same for MPLS data packets as already described above, and is also illustrated in FIG. 15. The frame headers 261 and frame trailers 262 of the respective IP data packets 252,256 from the other corresponding network rings are first removed by the respective computer nodes before they are used for reconstructing the lost IP data packet 250.

For successful recovering of lost persistent data, MPLS data packets or IP data packets of different network rings belonging to the same FEC codeword must be synchronized, so that reconstruction of the lost persistent data can be performed using the correct persistent data in other network/fiber rings.

A 64-bit ID field is used in the preferred embodiment of the invention to identity the MPLS/IP packet during the encoding process. The ID field appended to the different MPLS data packets but belonging to the same FEC codeword has the same ID value. Prior to reconstructing any lost MPLS/IP data packets, the ID field is used to identify the corresponding MPLS packets so that reconstruction of the lost data is performed using the correct MPLS/IP data packets.

Figure 16:
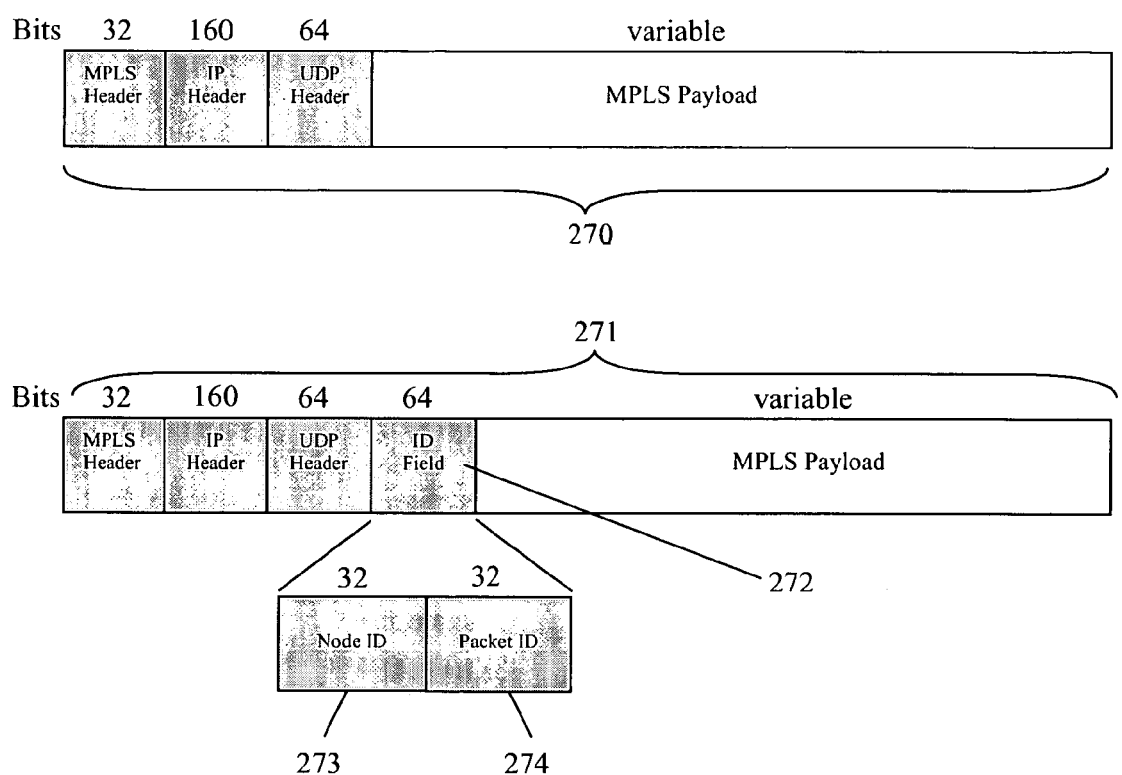
FIG. 16 shows the structure of a normal MPLS data packet and the structure of a MPLS data packet comprising an identity field according to the invention.

FIG. 16 shows the format of a MPLS packet 270 and a MPLS packet 271 containing the ID field 272.

The ID field 272 is divided into two components: a 32-bit Node ID 273 and a 32-bit Packet ID 274. The node ID 273 is the IP address of the DR-enabled node that injects the MPLS packet which forms the new FEC codeword, and the Packet ID 274 is used to differentiate the packets it has injected. By using the IP address of the node as part of the ID field 272, the possibility that the same ID value is assigned by two or more nodes is eliminated.

Figure 17:
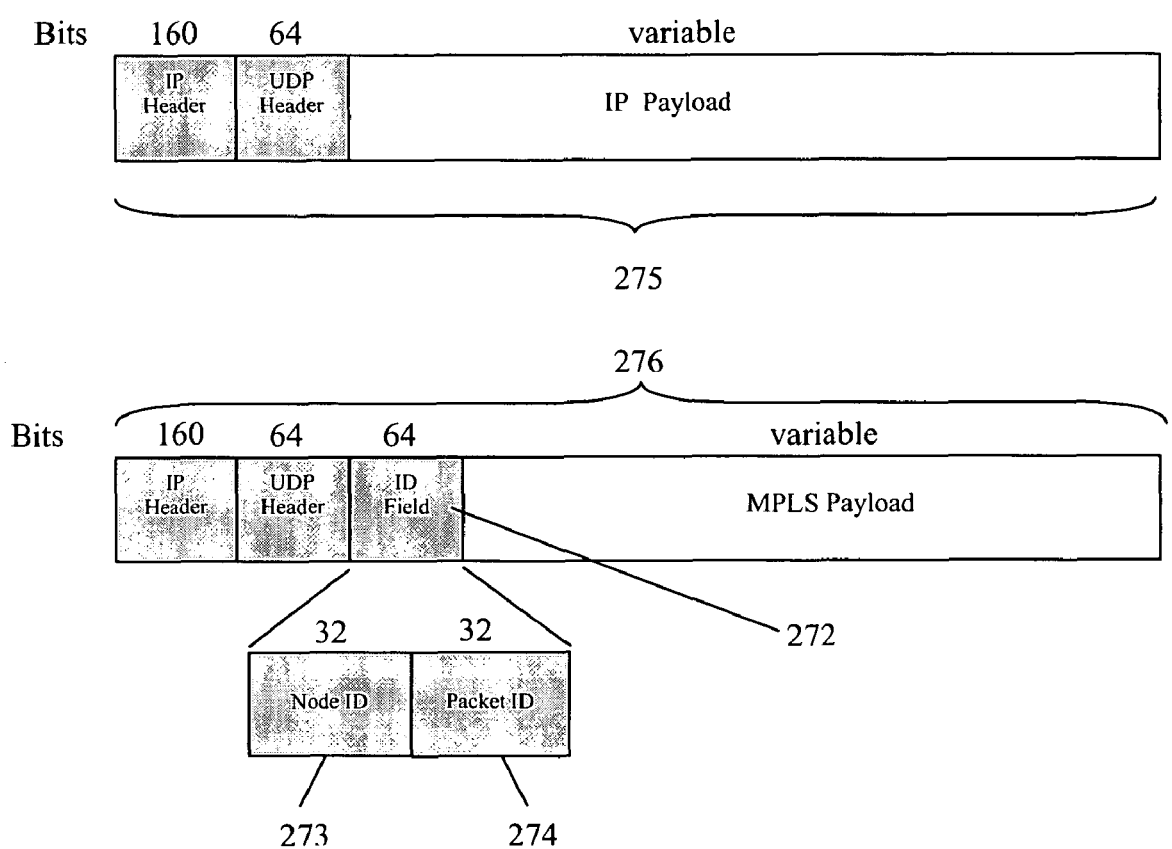
FIG. 17 shows the structure of a normal IP data packet and the structure of an IP data packet comprising an identity field according to the invention.

FIG. 17 shows the format of an IP packet 275 and an IP packet 276 containing the ID field 272. The IP packet 276 is similar to the MPLS packet 271 except that the IP packet 276 does not have the MPLS header which is present in the MPLS packet 271.

Only packets which are used to form new FEC codeword are assigned ID field 272 with new ID value. Data packets which are used to form part of an existing FEC codeword will have the same ID value of the ID field 272 of other data packets belonging to the same FEC codeword. Similarly, data packets which overwrites existing data packets in the same fiber ring will also have the same ID value as the existing data packets.

Every node in the network should preferably maintain a table to keep track of the ID values it has generated. The table is updated every time when an ID value is generated or removed. This is to ensure that the nodes do not run out of ID values to assign to data packets of a new FEC codeword.

It should be noted that the ID field need not be restricted to 64-bit. It may be of any length and any format as long as it can be used to uniquely identify a data packet.

The preferred embodiments described above for FEC encoding has their own advantages.

Specifically, FEC encoding using the fragmentation method has the advantage of simplicity as FEC encoding is performed only over a single MPLS data packet, and there is no need for the processor to read data packets from other fiber rings. Thus, it does not need to search for data packets of the same size in other fiber rings in order to perform FEC encoding as in the case of using the non-fragmentation method. In this case, such data without any data packets of the same size will not be protected using non-fragmentation method but is protected instead by duplicating the data packets in other fiber rings. Fortunately such data packets without any common sizes in other fiber rings are likely to be rare.

FEC encoding using the non-fragmentation method on the other hand reads the MPLS data packet continuously from a single fiber ring where no reconstruction of any lost data packet is required. This results in the processing overheads for each node of the network to be low as the nodes do not need to read data packets from other fiber rings as data lost only happen very rarely. Moreover, it is also more efficient for the nodes to read data packets from a single fiber ring than reading fragmented data over different fiber rings at all times using the fragmentation method.

Overall, the non-fragmentation method have lower computational overheads compared to the fragmentation method because the non-fragmentation method only needs to read from the different optical fibers only during the generation of parity data or during reconstruction of lost data, whereas the fragmentation method is required to read from the different fiber rings at all times.

It should also be pointed out that only one DR-enabled node in the computer network is sufficient for the data recovery method according to the invention to work. In other words, the computer nodes in the computer network may comprise of a mixture of DR-enabled nodes 280 and normal computer nodes 281 without the capability of generating parity data and reconstructing lost data. An example of a computer network comprising 4 optical fibers connecting the nodes is shown in FIG. 18.

Figure 18:
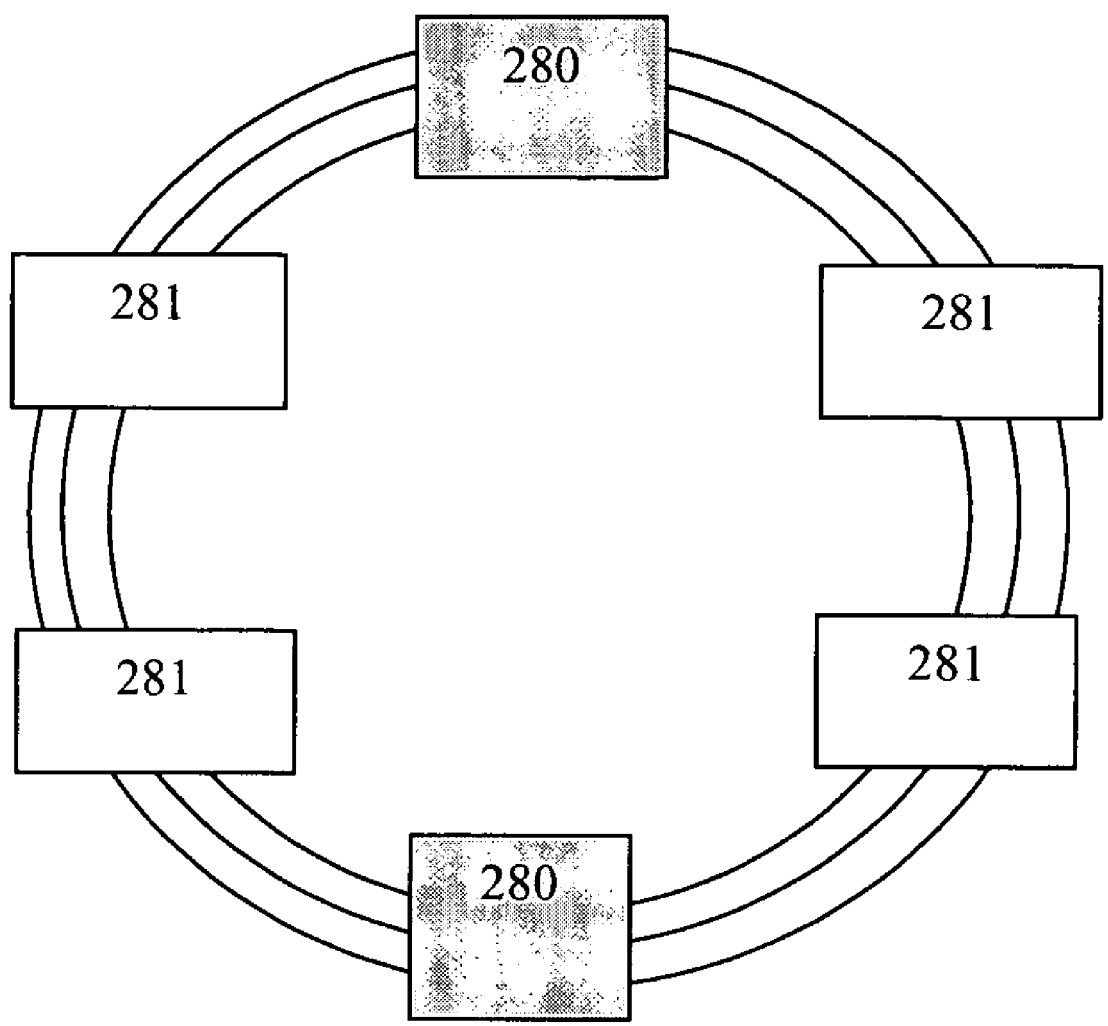
FIG. 18 shows a computer network comprising a mixture of data recovery enabled nodes and computer nodes which do not enable data recovery according to the invention.
Figure 19:
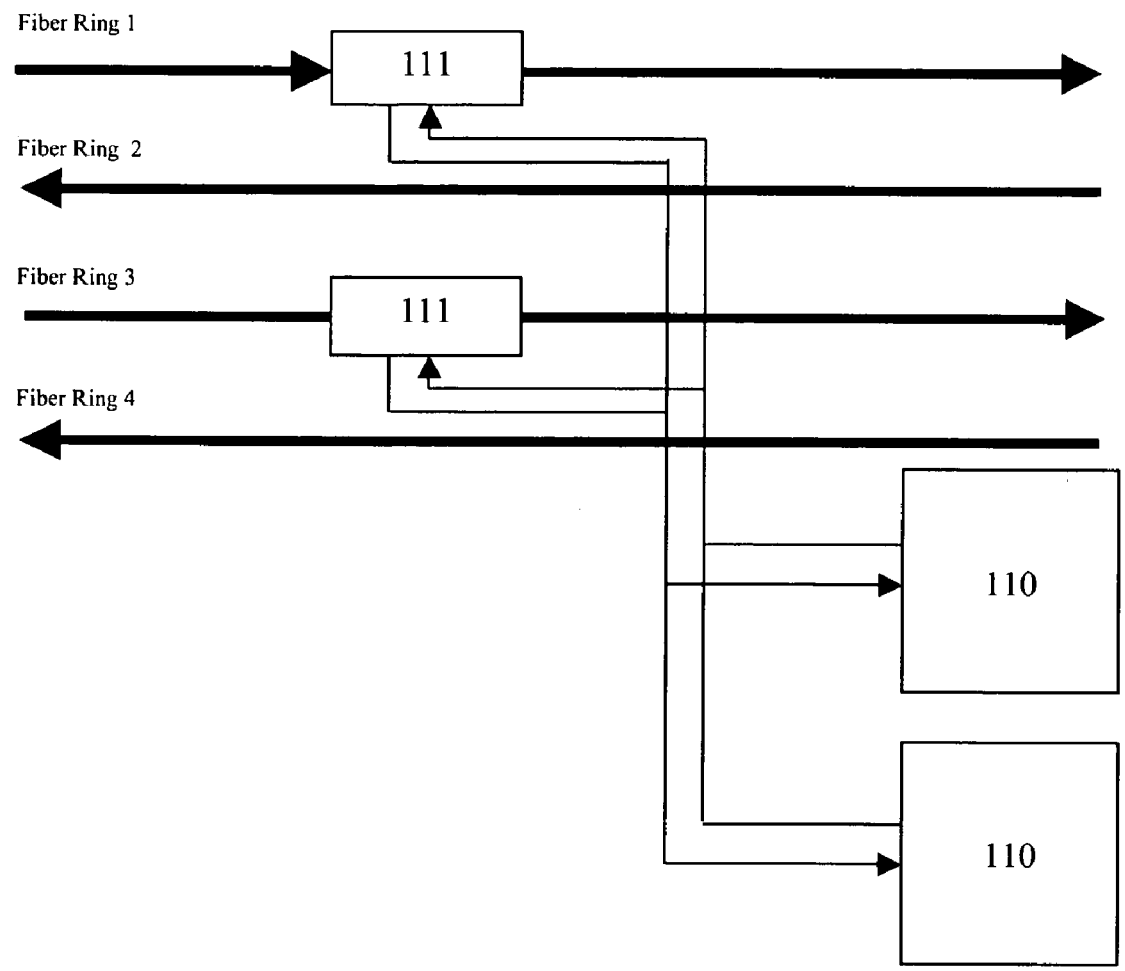
FIG. 19 shows the computer node which do not enable data recovery and is connected by four optical fibers.

An example of a normal node 281 or the computer network of FIG. 18 is shown in FIG. 19, wherein only two optical fibers are read by the node, and the other two optical fibers are passed through the node.

Figure 20:
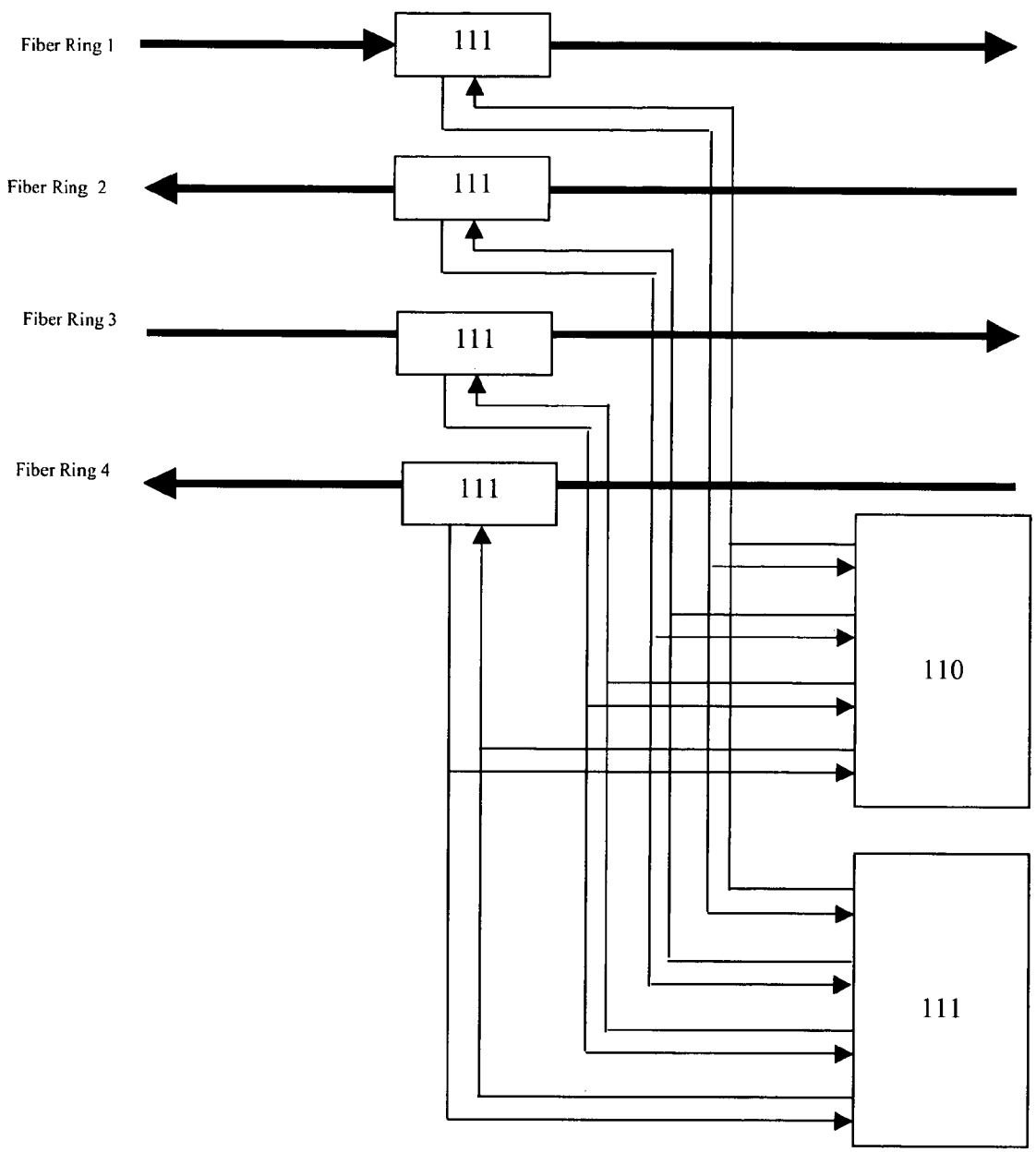
FIG. 20 shows the data recovery enabled computer node according to the invention and is connected by four optical fibers.

An example of an ER-enabled node 280 for the computer network of FIG. 18 is shown in FIG. 20. There are no optical switches in this ER-enabled node used for the purpose of partial storage restoration, as this requires a minimum of 6 optical fibers connecting the nodes.

In comparison, the non-fragmentation method requires less ER-enabled nodes than the fragmentation method to work efficiently, as the ER-enabled nodes of the former method only require to read from other optical fibers when generating the parity data or reconstructing lost data as already mentioned earlier.

Before the ER-enable node can reconstruct lost data, it must first be able to detect the lost of persistent data, for example, due to cutting of the optical fibers. Such lost of data may be detected using one of the following methods:
i. loss of light signal detected by an optical power monitoring system, or
ii. loss of frame synchronization detected by an interface card of the processor, or
iii. failure to detect a Resource Management MPLS packet (an additional MPLS packet that circulates continuously in every Fiber Ring) within a predefined time interval, or
iv. failure to read in the desired data packet within a predefined time interval.

EXAMPLE TO SHOW IMPROVEMENT OF DATA AVAILABILITY USING THE METHOD ACCORDING TO THE INVENTION

One of the performance indicator of the invention is data availability which is defined as a measure of whether the data is available to anyone who requests it. The data availability between a normal computer network and a computer network employing the current invention may be illustrated using an example.

The method for recovering data stored in a computer network may be implemented, for example, in the airport for verifying the particulars of people leaving and entering the country. Images of the people captured by cameras may be input into the computer network to be compared with photographs of wanted people or suspects. Such photographs are stored in the computer network by looping therein. Comparison of the photographs and the captured images can be performed at any distributed processors at the computer nodes of the network.

When any cables or fibers of the computer network is faulty, data looping in it will be lost. Therefore, the data recovery method according to the invention can be used to recover such lost data.

The following assumptions of the computer network are held:
i. The number of fiber rings is 4.
ii. In any given day, the probability that one fiber ring fails, $P_f$, is 0.002.
iii. The occurrence of the failure of the one fiber ring is random.
iv. A day is required to repair the failure of the one fiber ring.

Using binomial distribution, the probability of a failure of the network without implementing the method of the invention $$= 1.0 - [1.0 - P_f]^N$$
$$= 1.0 - [1.0 - 0.002]^4$$
$$= 0.008$$

Therefore, data availability if the method according to the invention is not used $$= 1.0 - 0.008$$
$$= 0.992$$
$$= 99.2\%$$

This is equivalent to an average of one failure in the computer network in every 125 days.

Using binomial distribution, the probability of a failure of the network which implemented the method of the invention $$= 1.0 - \{[\text{Probability that no fiber ring fail}] + [\text{Probability that one fiber ring fails}]\}$$
$$= 1.0 - \{[1.0 - P_f]^4 + [N!/(1!.(N-1)!)].P_f.[1.0 - P_f]^{N-1}\}$$
$$= 1.0 - \{[1.0 - 0.002]^4 + [4!/(1!.(3)!)].(0.002).[1.0 - 0.002]^3\}$$
$$= 1.0 - \{[0.998]^4 + 4.(0.002).[0.998]^3\}$$
$$= 0.00002394$$

Therefore, $$\text{data availability} = 1.0 - 0.00002394$$
$$= 0.99997606$$
$$= 99.997606\%$$

This is equivalent to an average of one failure in the computer network in every 41777 days (114 years). This shows that the method according to the invention can significantly improve the data availability of the computer network.

Also in order to determine the efficiency of using a low cost computer as the processor in a DR-enabled node, a simple programming for performing XOR computations to simulate the reconstruction of lost data from two other streams of data and a stream of parity data is written.

The program is executed on a computer using a 1.5 Ghz Pentium IV processor with 512 Megabytes of RAM. The program is able to reconstruct 152 million bits of data per second. Therefore, this shows that it is feasible to use such a low-cost computer to implement the processor in the DR-enabled nodes for reconstructing lost data in the computer network.

While the embodiments of the invention have been described, they are merely illustrative of the principles of the invention. Other embodiments and configurations may be devised without departing from the spirit of the invention and the scope of the appended claims.

The following references are cited in this document:

[1] "Wavelength Disk Drive", http://www.ccc.on.ca/wdd/.
[2] Rajiv Ramaswami, Kumar N. Sivarajan, "Optical Networks—A Practical Perspective", Second Edition, Morgan Kaufmann Publishers, ISBN 1-55860-655-6, 2002.
[3] Edgar Nett and Michael Mock, "A Recovery Model for Extended Real-Time Transactions, High-Assurance Systems Engineering Workshops, pp124–127, Washington D.C., 1997.
[4] Guangzhi Li, Jennifer Yates, Roberts Doverspike and Dongmei Wang, "Experiments in Fast Restoration using GMPLS in Optical/Electronic Mesh Networks", http://www.mplsrc.com/articles.shtml
[5] Ayan Banerjee, John Drake, Jonathan Lang, Brad Turner, Daniel Awduche, Lou Berger, Movaz Networks, Kireeti Kompella and Yakov Rekhter, "Generalised Multiprotocol Label Switching: An Overview of Signaling Enhancements and Recovery Techniques", IEEE Comms Magazine, pp144–151, July 2001.

[6] Minna Kaisa Juonolainen, "Forward Error Correction in INSTANCE", Cant Scient Thesis, 1999, http://www.ifi.uio.no/~paalh/students/minna.pdf

What is claimed is:

1. A method for enabling recovery of data stored in a computer network, the computer network comprises a plurality of computer nodes, the method comprising the steps of
generating a set of redundancy data based on a predetermined relationship between a first set of data and a second set of data;
injecting the first set of data, the second set of data and the set of redundancy data into separate looping paths of the computer network,
wherein a looping path is a path along a plurality of computer nodes in which data is transported, and the looping paths are defined in separate communication channels between the computer nodes and pass through at least one common node of the computer network, such that the redundancy data and the second set of data can be used to reconstruct the first set of data based on the predetermined relationship between the first and second set of data when the first set of data is lost, thereby enabling the recovery of data stored in the computer network.

2. The method for enabling recovery of data stored in a computer network according to claim 1, wherein the set of redundancy data is generated using a Forward Error Correction technique.

3. The method for enabling recovery of data stored in a computer network according to claim 2, wherein the set of redundancy data is generated based on an Exclusive-OR relationship between the first set of data and the second set of data.

4. The method for enabling recovery of data stored in a computer network according to claim 1, further comprising the step of adding an identity field having a predefined value to each of the first set of data, the second set of data and the set of redundancy data, wherein the predefined value of the identity field of the first set of data, the second set of data and the set of redundancy data corresponds with one another.

5. The method for enabling recovery of data stored in a computer network according to claim 4, further comprising the steps for storing a new first set of data:
receiving the new first set of data to be stored in the computer network;
adding an identity field having a predefined value to the new first set of data, wherein the predefined value of the new first set of data is the same as the predefined value of the identity field of the first set of data;
reading the second set of data from the respective looping path of the computer network, wherein the predefined value of the identity field of the second set of data corresponds to the predefined value of the identify field of the first set of data;
generating a new set of redundancy data based on a predetermined relationship between the new first set of data and the second set of data,
injecting the new first set of data together with its corresponding identity field into the looping path of the first set of data, wherein the new first set of data replaces the first set of data, and
injecting the new set of redundancy data into the looping path of the set of redundancy data, wherein the new set of redundancy data replaces the set of redundancy data which has the predefined value of the identity field corresponding with the predefined value of the identity field of the first set of data.

6. The method for enabling recovery of data stored in a computer network according to claim 4, wherein the predefined values of the identity field of the first set of data, the second set of data and the set of redundancy data are set to the same value.

7. The method for enabling recovery of data stored in a computer network according to claim 1, further comprising the steps of
fragmenting a payload of a data packet to be stored in the computer network into at least a first sub-packet and a second sub-packet; and
adding a data packet header of the data packet to both the first sub-packet and the second sub-packet to form the first set of data and the second set of data, respectively.

8. The method for enabling recovery of data stored in a computer network according to claim 7, further comprising the step of adding an identity field having a predefined value to each of the first sub-packet, the second sub-packet and the set of redundancy data, wherein the predefined value of the identity field of the first set of data, the second set of data and the set of redundancy data correspond with one another.

9. A method for recovering data stored in a computer network, the computer network comprises a plurality of nodes, the method comprising the steps of
reconstructing a first set of data from a second set of data and a set of redundancy data stored in separate looping paths of the computer network when the first set of data is lost, wherein the set of redundancy data is generated based on a predetermined relationship between the first set of data and the second set of data, and
injecting the reconstructed first set of data into the looping path of the first set of data to be stored therein, thereby recovering the first set of data stored in the computer network.

10. The method for recovering data in a computer network according to claim 9, wherein the set of redundancy data is generated based on an Exclusive-OR relationship between the first set of data and the second set of data.

11. The method for recovering data in a computer network according to claim 10, wherein the first set of data is reconstructed based on an Exclusive-OR relationship between the second set of data and the set of redundancy data.

12. The method for recovering data in a computer network according to claim 9, further comprising the step of
reading the second set of data and the set of redundancy data from the respective looping paths of the computer network,
wherein the second set of data and the set of redundancy data each have an identity field having a value which corresponds to a predefined value of an identity field of the first set of data.

13. The method for recovering data in a computer network according to claim 9, further comprising the step of
reading the second set of data and the set of redundancy data from the respective looping paths of the computer network,
wherein the first set of data, the second set of data and the set of redundancy data have identical data packet headers,
wherein the second set of data and the set of redundancy data each have an identity field having a value which corresponds to a predefined value of-an identity field of the first set of data.

14. A data recovery system for data stored in a computer network, the computer network comprises a plurality of computer nodes, the data recovery system comprises:

a processing unit at at least one node for generating a set of redundancy data based on a predetermined relationship between a first set of data and a second set of data;

a read and write unit for injecting the first set of data, the second set of data and the set of redundancy data into separate looping paths of the computer network, wherein a looping path is a path along a plurality of computer nodes in which data is transported, and the looping paths are defined in separate communication channels between the computer nodes and pass through at least one common node of the computer network.

15. The data recovery system for data stored in a computer network according to claim 14, wherein the communication channels connecting the computer nodes are optical fiber cables.

16. The data recovery system for data stored in a computer network according to claim 15, the system further comprises at least an optical switch for switching a pair of optical fiber cables.

17. The data recovery system for data stored in a computer network according to claim 16, wherein the system comprises at least three pairs of optical fibers connecting the nodes of the computer network.

18. A data recovery system for data stored in a computer network, the computer network comprises a plurality of computer nodes, the data recovery system comprises:

a processing unit at at least one node for reconstructing a first set of data from a second set of data and a set of redundancy data stored in separate looping paths of the computer network when the first set of data is lost, wherein the set of redundancy data is generated based on a predetermined relationship between the first set of data and the second set of data, and a read and write unit for injecting the reconstructed first set of data into the looping path of the first set of data to be stored therein to recover the first set of data stored in the computer network, wherein a looping path is a path along a plurality of computer nodes in which data is transported, and the looping paths are defined in separate communication channels between the computer nodes and pass through at least one common node of the computer network.

19. The data recovery system for data stored in a computer network according to claim 18, wherein the communication channels between the computer nodes are optical fiber cables.

20. The data recovery system for data stored in a computer network according to claim 19, the system further comprises at least an optical switch for switching a pair of optical fiber cables.

21. The data recovery system for data stored in a computer network according to claim 20, wherein the system comprises at least three pairs of optical fibers connecting the nodes of the computer network.

* * * * *